(12) United States Patent
Park et al.

(10) Patent No.: US 8,911,890 B2
(45) Date of Patent: Dec. 16, 2014

(54) SYSTEM AND METHOD FOR CONTROLLING COOLING OR HEATING OF BATTERY

(71) Applicants: Hyundai Motor Company, Seoul (KR); Kia Motors Corporation, Seoul (KR)

(72) Inventors: Jae Woo Park, Gyeonggi-do (KR); Jae Woong Kim, Gyeonggi-do (KR); Man Ju Oh, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 107 days.

(21) Appl. No.: 13/693,731

(22) Filed: Dec. 4, 2012

(65) Prior Publication Data
US 2014/0072839 A1  Mar. 13, 2014

(30) Foreign Application Priority Data
Sep. 7, 2012 (KR) .................. 10-2012-0099405

(51) Int. Cl.
| | |
|---|---|
| *H01M 2/00* | (2006.01) |
| *H01M 10/60* | (2014.01) |
| *H01M 2/34* | (2006.01) |
| *H01M 2/10* | (2006.01) |
| *H01M 10/625* | (2014.01) |
| *H01M 10/61* | (2014.01) |
| *G05D 23/275* | (2006.01) |

(52) U.S. Cl.
CPC .......... *H01M 10/5016* (2013.01); *H01M 10/50* (2013.01); *H01M 2/345* (2013.01); *H01M 2/348* (2013.01); *H01M 2/1094* (2013.01); *G05D 23/27529* (2013.01); *Y02T 10/7005* (2013.01); *Y02T 10/88* (2013.01); *H01M 10/5002* (2013.01)
USPC ............... 429/61; 429/62; 429/71; 429/90; 429/120; 429/148; 429/153; 429/163

(58) Field of Classification Search
CPC ......... H01M 10/5016; H01M 6/5038; H01M 2/345; H01M 2/348; H01M 10/50; H01M 10/5006; H01M 10/5026; H01M 10/443; H01M 10/445; H01M 10/486; H01M 10/5008; H01M 10/502; H01M 10/5034; H01M 2006/50; H01M 2200/10
USPC .......... 429/61, 62, 71, 90, 120, 148, 153, 163
See application file for complete search history.

(56) References Cited

U.S. PATENT DOCUMENTS

2011/0045326 A1* 2/2011 Leuthner et al. ................ 429/72

* cited by examiner

*Primary Examiner* — Patrick Ryan
*Assistant Examiner* — Ben Lewis
(74) *Attorney, Agent, or Firm* — Edwards Wildman Palmer LLP; Peter F. Corless

(57) ABSTRACT

Disclosed herein is a system for controlling the cooling or heating of a battery. The system includes a battery having a hermetic sealing structure to prevent passage of air from an exterior, a pressure sensor provided on the battery to measure internal pressure of the battery, an climate control system cooling or heating the battery, and a controller determining cooling or heating of the climate control system depending on whether the internal pressure of the battery is positive pressure or negative pressure based on a measured result of the pressure sensor, the controller controlling cooling or heating strength depending on a level of the positive pressure or negative pressure.

8 Claims, 3 Drawing Sheets

SYSTEM AND METHOD FOR CONTROLLING COOLING OR HEATING OF BATTERY

CROSS-REFERENCE TO RELATED APPLICATION

This application claims under 35 U.S.C. §119(a) the benefit of Korean Patent Application No. 10-2012-0099405 filed Sep. 7, 2012, the entire contents of which are incorporated herein by reference.

BACKGROUND (a) Technical Field

The present invention relates to a system and method for improving the output performance of a battery of an environment-friendly vehicle or the like, and more particularly, to a system and method for controlling the cooling and/or heating of a battery, which is configured to control the temperature more reliably and precisely.

(b) Background Art

Some batteries are made in the form of one module using a plurality of cells each having a thin plate structure. A plurality of modules are typically connected in series to make up a battery pack, depending on the performance of a vehicle (i.e., how much power is required from the vehicle). These battery packs which include a plurality of modules are typically surrounded by a housing, a cover or the like to protect the modules from exterior elements.

When such a battery pack is charged or discharged via a chemical reaction, heat is generated within the cell. The charging or discharging power of the battery changes depending on the temperature of the cell. Thus, it is important that the temperature of the cell be maintained within a proper range so that the battery is operated with its internal temperature of between about 20° C. to 40° C., for example.

Accordingly, vehicles with high voltage battery, which especially generate a lot of heat, such as electric vehicles, should be provided with both a cooling system the high-voltage battery when the battery becomes too hot and a battery heating system to warm the battery when the internal temperature is too cold.

However, according to the prior art, the battery is merely cooled by the air suctioned from the interior of the vehicle, therefore, there is currently no method or device for heating these modules in the winter when the battery temperature may become too cold.

Further, the temperature of the air in the interior of the vehicle is not reliable because it can be affected by several variables, such as operating an air conditioner, the number of passengers, an open window or door, the outside temperature, etc. Thus, there is no guarantee that the air provided to the battery is at the proper temperature to effectively cool the battery. That is, the temperature of the indoor air may be too hot or to cool to appropriately cool or heat the battery, thus causing the battery to be overheated or operated inefficiently.

Furthermore, when batteries are operated below a certain temperature (i.e., 0° C.), the voltage supplied from the battery cell decreases. As a result, it may become impossible to supply power the required to the vehicle to start the vehicle. Furthermore, under a low-temperature conditions, the prior art is problematic in that the battery does not charged smoothly. Thus, in order to ensure the performance of the battery, a system for optimizing the temperature of the cell through heating and cooling is essential, and a more reliable control method and a device therefore is required compared to the conventional air conditioning using indoor air.

The description provided above as a related art of the present invention is just for helping understanding the background of the present invention and should not be construed as being included in the related art known by those skilled in the art.

SUMMARY OF THE DISCLOSURE

The present invention has been made in an effort to solve the above-described problems associated with prior art. An object of the present invention is to provide a system and method for controlling the cooling or heating of a battery, which is configured to control temperature of air applied to the battery modules more reliably and precisely.

In order to accomplish the object, the present invention provides a system for controlling the cooling and heating of a battery, including a battery having a hermetic sealing structure to prevent passage of air from the exterior; a pressure sensor provided on the battery to measure internal pressure of the battery; an climate control system configured to cooling and heating air supplied to the battery housing; and a controller configured to determine whether to heat or cool the battery depending on whether the internal pressure of the battery is a positive pressure or a negative pressure based on a measured result of the pressure sensor. Furthermore, the controller is also configured to control the amount air and temperature of the air supplied by the climate control system depending on a level of the positive pressure or negative pressure measured.

The system may further include a communicating passageway/pipe connecting the interior of the battery with the exterior of the battery housing, and an on-off valve provided within the communicating passageway to open and close the passageway between the interior of the battery housing and the exterior of the battery housing. More specifically, the controller is configured to open and close the on-off valve when a positive pressure or a negative pressure of the battery is above a predetermined threshold.

The system may further include a relief valve installed at the communicating passageway to equalize the atmospheric pressure and the internal pressure of the battery once the on-off valve is opened.

The controller may control the climate control system to provide cool air when the internal pressure of the battery is positive pressure, and control the climate control system to provide warm air when the internal pressure of the battery is a negative pressure.

The controller may also calculate the internal pressure or temperature of the battery depending on the measured pressure, and may stop cooling or heating the battery housing when the internal pressure or temperature of the battery is reaches a stable range (i.e., falls below or above a positive pressure threshold or a negative pressure threshold, respectively).

Meanwhile, a method for controlling cooling or heating of a battery using the control system includes determining and selecting, by the controller, whether to cool or heat the battery housing depending on whether an internal pressure of the battery is a positive pressure or a negative pressure; and regulating, by the climate control system and the controller, a cooling or heating strength depending on an internal pressure of the battery, namely, a positive pressure or a negative pressure.

The above, method may also include calculating the internal pressure or temperature of the battery by measuring the positive pressure or the negative pressure within the battery housing; and terminating cooling or heating the battery when the internal pressure or temperature of the battery is within a stable range.

Alternatively, a method for controlling cooling or heating of a battery may include selecting cooling or heating of a climate control system depending on whether internal pressure of the battery is a positive pressure or a negative pressure; reducing a cooling strength (e.g., the temperature and amount of cool air supplied to the battery housing) when the internal pressure of the battery is less than or equal to atmospheric pressure, and terminating cooling when the internal pressure or temperature of the battery calculated based the positive pressure or negative pressure decreases to less than or equal to a first predetermined value, while cooling the battery housing; and reducing heating strength (e.g., the temperature and amount of warm air supplied to the battery housing) when the internal pressure of the battery is greater than or equal to atmospheric pressure, and terminating heating the battery housing when the internal pressure or temperature of the battery calculated based on a level of the positive pressure or negative pressure increases to greater than or equal to a second predetermined value or more, in heating control.

Alternatively, a method for controlling cooling or heating of a battery may include opening an on-off valve when a positive pressure or a negative pressure of the battery exceeds a given threshold; and closing the on-off valve when internal pressure and atmospheric pressure of the battery are equalized.

Alternatively, a method for controlling cooling or heating of a battery may include measuring pressure of a battery, which is sealed from an exterior environment, cooling or heating the battery when the battery is a positive pressure or a negative pressure, controlling cooling or heating strength depending on an amount the positive pressure or the negative pressure exceeds the given threshold, and terminating cooling or heating when internal pressure or temperature of the battery calculated from measured positive pressure or the negative pressure is within a stable range.

The method for controlling cooling or heating of the battery constructed as described above is advantageous in that the battery is made in a hermetic sealing system and configured to measure pressure therein, and cooling or heating control is performed depending on an internal pressure value, so that a smaller and lighter system is configured at low cost, and the response speed is more rapid, compared to calculating the temperature value of the temperature sensor installed in each battery cell.

Further, the invention can precisely control the battery temperature, so that the durability of the battery is improved and repair cost is reduced. Electric energy is efficiently managed, so that a driving distance is increased and marketability is enhanced.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
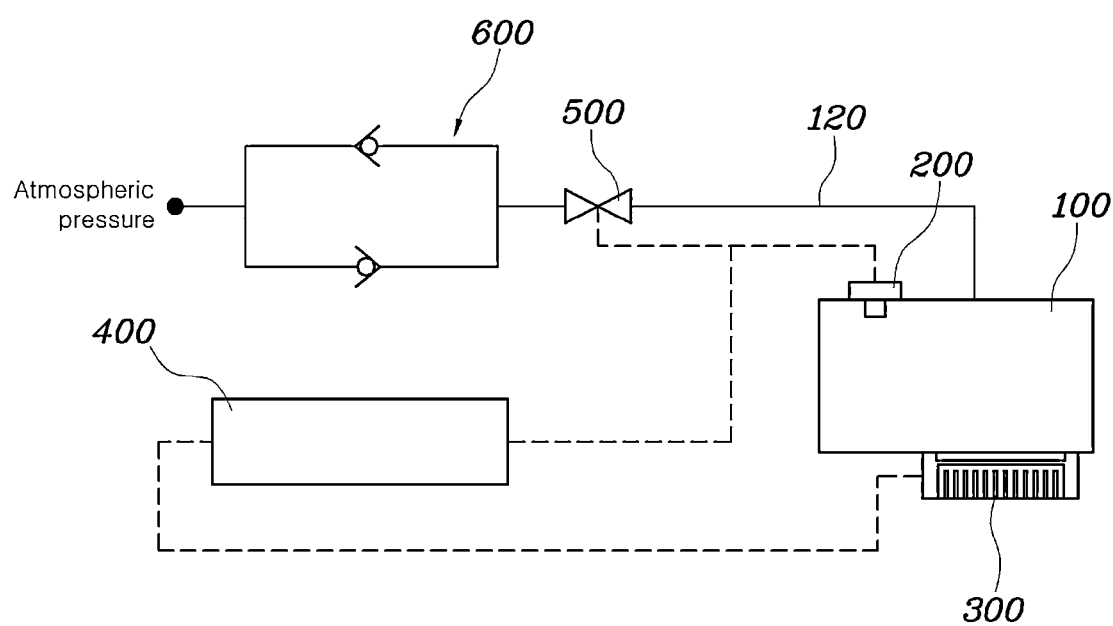
FIG. 1 is a view showing a system for controlling cooling or heating a battery according to an exemplary embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Additionally, it is understood that the below methods are executed by at least one controller. The term controller refers to a hardware device that includes a memory and a processor. The memory is configured to store the modules and the processor is specifically configured to execute said modules to perform one or more processes which are described further below.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Hereinafter reference will now be made in detail to various embodiments of the present invention, examples of which are illustrated in the accompanying drawings and described below.

First, FIG. 1 is a view showing a system for controlling cooling or heating a battery according to an exemplary embodiment of the present invention. The system for controlling the cooling or heating of the battery according to the present invention includes a battery 100, a pressure sensor 200, a climate control system 300, and a controller 400. The battery 100 has a hermetic structure to prevent passage of air between the interior of the battery housing and an exterior of the battery housing. The pressure sensor 200 may be provided on the battery 100 to measure the internal pressure of the battery/battery housing 100. The climate control system 300 cools or heats the battery 100. The controller 400 determines the cooling or heating of the climate control system 300 depending on whether the internal pressure of the battery 100 is a positive pressure or a negative pressure based on the measured result of the pressure sensor 200, and controls cooling or heating strength depending the positive pressure or negative pressure (i.e., the measure positive or negative pressure).

The battery/battery housing 100 of the present invention refers to an entire battery system that is composed of a plurality of battery cells and a module, the module being surrounded by a housing, a cover, etc. Such a battery 100 of the present invention is designed to be sealed to prevent air from inside the housing from escaping and air from outside the housing from being admitted and to have considerably high thermal efficiency to effectively control the climate within the battery 100. Further, a temperature sensor for measuring the temperature of the battery 100 is not required. Therefore, calculations are minimized while processing time is decreased.

A pressure sensor 200 is attached to a surface of a tray of the battery 100 of the present invention to measure pressure in the tray. Further, when the measured pressure compared with atmospheric pressure is a positive (+) pressure, the temperature in the tray is high and therefore the pressure rises, so that the battery 100 needs to be cooled. In contrast, when the measured value is negative (−) pressure, the battery 100 should be heated to warm the interior of the tray of the battery 100.

Meanwhile, when the pressure in the battery tray dramatically rises or lowers, a solenoid valve, e.g., a safety device for preventing damage to the tray) is opened. Thereby, an abnormally excessive low pressure or an abnormally excessive high pressure may be relieved via a relief valve.

To this end, the controller 400 determines cooling or heating of the climate control system 300 depending on whether the internal pressure of the battery 100 is positive pressure or negative pressure based on the measured result of the pressure sensor 200, and controls cooling or heating strength depending on of the measured positive pressure or negative pressure.

The battery 100 of the present invention is a hermetic structure to prevent the passage of air between the interior and exterior. This allows only a relatively small volume of air to be used in cooling or heating control, thus enabling temperature control within the battery 100. Further, rather than merely using the interior air, to cool the battery 100, the present invention utilizes a separate climate control system 300, such as a Peltier device. A Peltier device is preferably provided to perform the cooling or heating control in the controller 400. Such a climate control system 300 of the battery may be designed to be sealed together with the battery 100 using a duct or the like, and may be sealed integrally with the battery 100 in some embodiments.

Meanwhile, in the conventional art, in order to measure the pressure or temperature of the sealed battery 100, a temperature sensor should be mounted to every cell in the tray. However, such a configuration is problematic in that numerous sensors are required and the entire tray must be repaired when the sensors fail, so strategy is very inefficient. The exemplary embodiment, however, does not require numerous sensors be placed throughout the tray.

Figure 3:
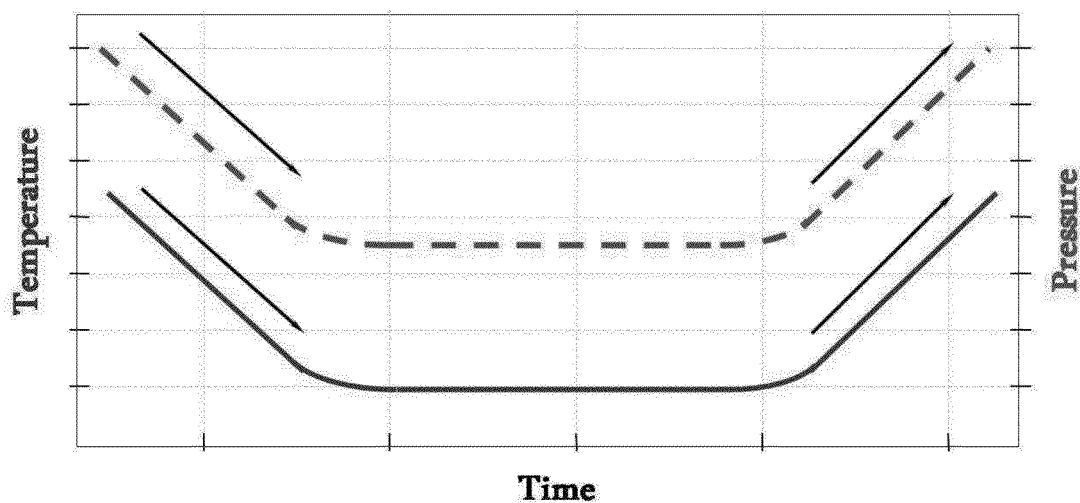
FIG. 3 is a graph showing a relationship between pressure and temperature in the sealed battery.

For reference, FIG. 3 is a graph showing a relationship between the pressure and temperature in the sealed battery 100. It can be seen that a change of temperature correspond to that of pressure in the sealed space. Thus, a pressure difference is recognized based on how far a diaphragm of the pressure sensor is bent, so that the pressure of the battery can be obtained by removing the atmospheric pressure therefrom. Further, the temperature is derived from the amount of the pressure measured. Meanwhile, according to the Charles'Law, the change in temperature is proportional to that of pressure, thus the temperature difference may be obtained directly from the pressure difference, and the temperature of the battery may be obtained with reference to the temperature of the atmosphere. That is, the temperature of the battery can be easily derived from the data provided by the pressure sensor and surrounding environment in various ways.

Additionally, the system for controlling the cooling or heating of the battery according to the present invention may further include a communicating passageway 120 and an on-off valve 500. The communicating passageway 120 is connected to the interior of the battery 100 to create a passageway between the interior of the battery 100 the exterior of the battery. The on-off valve 500 is provided within the communicating passageway 120 to open and close the passageway. The controller 400 is configured to open the on-off valve 500 when the positive pressure or negative pressure of the battery 100 is greater than a predetermined threshold.

Moreover, a relief valve 600 may be installed as well within the communicating passageway 120 to equalize the atmospheric pressure and the internal pressure of the battery 100 when the on-off valve 500 is opened. Therefore, when the positive or negative pressure of the battery 100 is too great (e.g., above a threshold value), the controller 400 opens the on-off valve 500 and pressure is equalized by the relief valve 600, thus preventing the battery 100 from being damaged. Subsequently, when the pressure is equalized, the on-off valve 500 is closed again to perform normal climate control operation.

Further, the controller 400 may be configured to execute a control that cools the battery when the internal pressure of the battery 100 is a positive pressure, and execute a control that heats the battery when a negative pressure is measured. The controller 400 then calculates the internal pressure or temperature of the battery 100 based on the measured pressure, and terminates the cooling or heating control when the internal pressure or temperature of the battery 100 is within a stable range.

Figure 2:
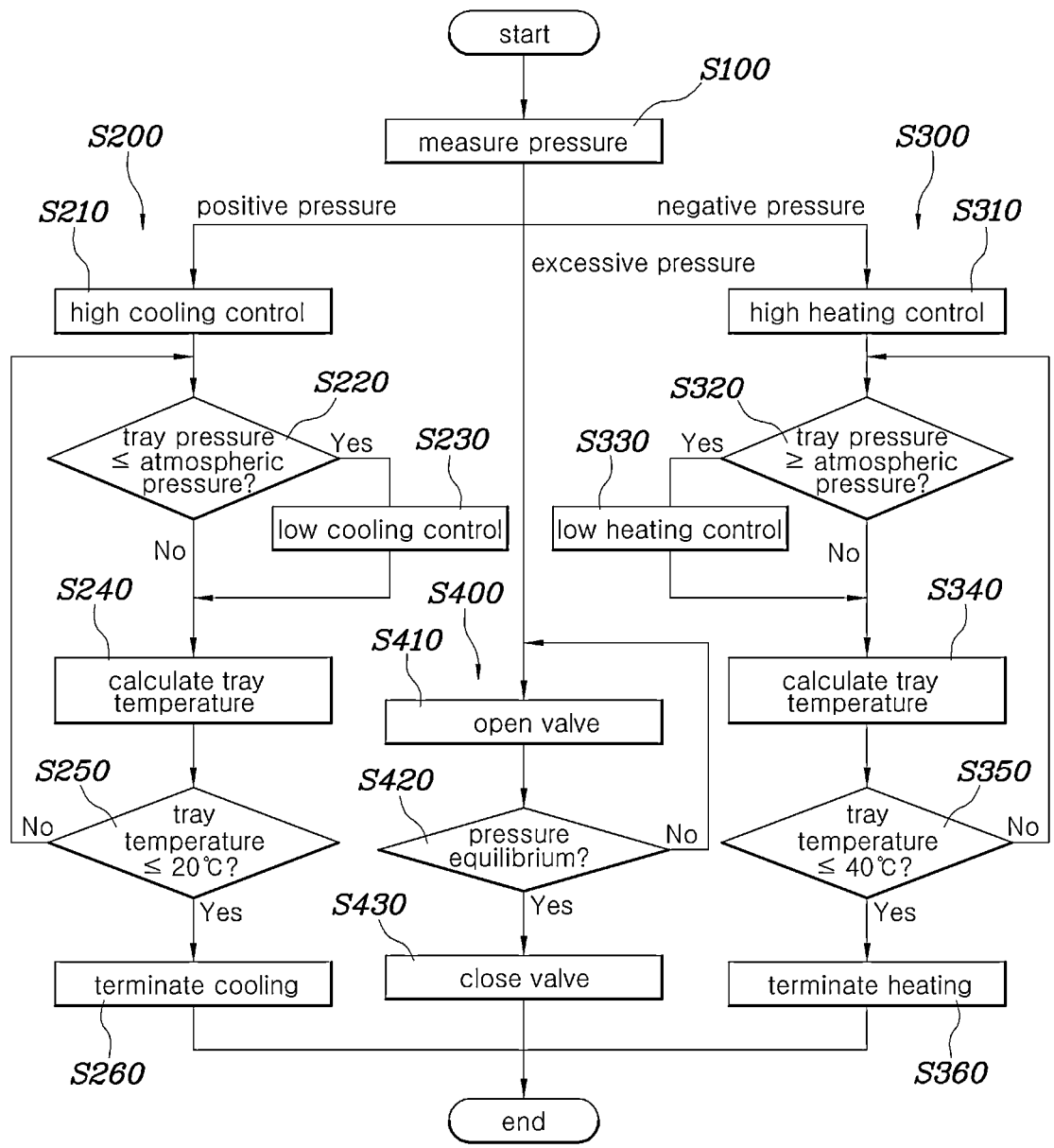
FIG. 2 is a flowchart showing a method for controlling cooling or heating a battery using the system for controlling the cooling or heating of the battery shown in FIG. 1.

FIG. 2 is a flowchart showing a method for controlling cooling or heating of a battery using the system for controlling the cooling or heating of the battery shown in FIG. 1. The method for controlling the cooling or heating of the battery using the control system of claim 1 includes a selection step S100 of selecting cooling or heating of the climate control system depending on whether the internal pressure of the battery is a positive or negative pressure, and regulation steps S200 and S300 that regulate cooling or heating strength (i.e., the temperature of the air and amount of air applied to the battery) depending on the measured the internal pressure of the battery, namely, the positive pressure or negative pressure.

The regulation step S200, S300 may include a calculation step S240, S340 for measuring the amount of positive or negative pressure and calculating the internal pressure or temperature of the battery accordingly, and a termination step S260, S360 of terminating the cooling or heating operation when the internal pressure or temperature of the battery is within a stable range.

Specifically, the method for controlling the cooling or heating of the battery for vehicles according to the present invention includes selection steps S100, S210 and S310 of selecting cooling or heating of the climate control system depending on whether the internal pressure of the battery is positive pressure or negative pressure, a cooling step S200 of restep Sspheric pressure and of terminating cooling when the internal pressure or temperature of the battery, calculated based on the positive or negative pressure, decreases to less than or equal to a first predetermined value, and a heating step S300 of reducing heating strength when the internal pressure of the battery is greater than or equal to an atmospheric pressure and terminating heating when the internal pressure or temperature of the battery calculated based on the positive or negative pressure increases to greater than or equal to a second predetermined value.

At step S100, the pressure sensor measures the amount of pressure in the battery housing based on how much and the direction a diaphragm within the sensor is bent. If the diaphragm is bent towards the atmospheric pressure, the pressure of the battery is high, so that it is determined that the battery is at high temperature, and thereby the cooling control is performed at step S200. Further, when the diaphragm is bent towards the battery, the pressure of the battery is low, so that it is determined that the battery is at low temperature, and thereby the heating control is performed at step S300. When the control is performed, an increased rate of cooling or an increased rate of heating is initially performed at steps S210 and S310. At the initial stage, the battery may be at an excessively low or high temperature due to outdoor temperature.

Meanwhile, in the cooling control S200, when the internal pressure of the battery is the atmospheric pressure or less at step S220, cooling strength is reduced at step S230. When the pressure or temperature decreases to a predetermined value or less at steps S240 and S250, the cooling operation is terminated at step S260.

Further, in the heating control S300, when the internal pressure of the battery is the atmospheric pressure or more at step S320, heating strength is reduced at step S330. This means the temperature of the air and the amount of air is increased. Once the pressure or temperature increases to a predetermined value at steps S340 and S350, the heating operation is terminated at step S360. Further, when the pressure reaches a maximum value to form a contact point, the on-off valve and the relief valve are opened at step S410 to perform calibration to have a proper pressure difference reestablished. When the pressure becomes in equilibrium at step S420, the valve is closed at step S430. This will be effective to protect the sensor and the battery.

The cooling or heating sensor of the battery for vehicles constructed as described above, the cooling or heating system using the sensor, and the control method are intended to provide a battery tray in a hermetic sealing system to measure pressure, and to perform heating or cooling control depending on a pressure value measured therein, so that the invention achieves miniaturization and reduced weight with low cost and a rapid response speed, as compared to the conventional method of calculating the temperature value of the temperature sensor installed in each battery cell based upon temperature sensors installed throughout. Further, the invention can precisely control the battery temperature, so that the durability of the battery is improved and repair costs are reduced. Electric energy is efficiently managed, so that a driving distance is increased and marketability is enhanced.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A system for controlling cooling or heating of a battery, comprising:
    a battery having a hermetic sealing structure to prevent passage of air f between an interior region of the battery and an exterior region;
    a pressure sensor provided on the battery and configured to measure an internal pressure of the battery;
    a climate control system configured to cool and heat the battery;
    a controller configured to determine whether to cool or heat the battery depending on whether the internal pressure of the battery is a positive pressure or a negative pressure based on a measured result of the pressure sensor, the controller controlling a cooling or a heating strength depending of the measured positive pressure or negative pressure,
    a communicating passageway connected to an interior of the battery to an exterior of the battery; and
    an on-off valve provided within the communicating passageway to perform a selective on-off operation,
    wherein the controller opens the on-off valve when the positive pressure or negative pressure of the battery is exceeds a maximum value and closes the on-off valve when internal pressure and atmospheric pressure of the battery equal.

2. The system according to claim 1, further comprising:
    a relief valve installed within the communicating passageway to equalize pressure between an atmospheric pressure and the internal pressure of the battery when the on-off valve is opened.

3. The system according to claim 1, wherein
    the controller cools the battery when the internal pressure of the battery is positive pressure, and heats the battery when the internal pressure of the battery is negative pressure.

4. The system according to claim 3, wherein
    the controller calculates the internal pressure or temperature of the battery depending on the measured pressure, and terminates the cooling or heating control when the internal pressure or temperature of the battery is within a stable range.

5. A method for controlling cooling or heating of a battery using a control system according to claim 1, comprising:
    selecting, by a controller, cooling or heating of an climate control system depending on whether internal pressure of the battery is positive pressure or negative pressure; and
    regulating, by the controller, cooling or heating strength depending on a level of the internal pressure of the battery, namely, the positive pressure or negative pressure.

6. The method according to claim 5, further comprising:
    calculating the internal pressure or temperature of the battery by measuring the level of the positive pressure or negative pressure; and
    terminating the cooling or heating when the internal pressure or temperature of the battery is within a stable range.

7. A method for controlling cooling or heating of a battery using a control system according to claim 1, comprising:
    selecting, by the controller, cooling or heating of a climate control system depending on whether internal pressure of the battery is positive pressure or negative pressure;
    reducing, by the controller, cooling strength when the internal pressure of the battery is less than or equal to atmospheric pressure, and terminating cooling when the internal pressure or temperature of the battery calculated based on a level of the positive pressure or negative pressure decreases to less than or equal to a first predetermined value; and
    reducing, by the controller, heating strength when the internal pressure of the battery greater than or equal to atmospheric pressure, and terminating heating when the internal pressure or temperature increases to greater than or equal to a second predetermined.

8. A method for controlling cooling or heating of a battery, comprising:

measuring, a sensor, pressure of the battery sealed from an exterior;

cooling or heating, by a climate control system, the battery when the battery is positive pressure or negative pressure;

controlling, by a controller, cooling or heating strength supplied to the battery depending on the positive pressure or negative pressure;

terminating cooling or heating when an internal pressure or temperature of the battery calculated from the positive pressure or negative pressure is within a stable range;

opening an on-off valve when the positive pressure or negative pressure of the battery is greater than a maximum value; and closing the on-off valve when internal pressure and atmospheric pressure of the battery equal.

* * * * *